Patented Jan. 6, 1948

2,433,928

UNITED STATES PATENT OFFICE 2,433,928

METHOD OF IMPROVING STABILITY AND ULTRAVIOLET TRANSMISSION OF GLASS

John L. Sheldon, Corning, N. Y., assignor to Corning Glass Works, Corning, N. Y., a corporation of New York No Drawing. Application October 10, 1945, Serial No. 621,605

10 Claims. (Cl. 49—77)

This invention is a continuation in part of my pending application Serial Number 412,888, filed September 29, 1941, which has become abandoned and relates to treatments of glass for improving its chemical and physical characteristics, particularly its resistance to the weathering action of atmospheric moisture. Various treatments for the prevention of weathering have been proposed for the more common glasses, such as soda-lime glasses and the like which are used for the fabrication of containers, etc. Atmospheric moisture reacts with surface alkali on such glasses, when freshly fabricated, and it has been proposed to treat the freshly fabricated glass with acid gases, steam under pressure, etc., to remove the surface alkali. The prior methods are ineffective with borosilicate glasses containing more than 15%.

The effect of weathering of such glasses is very objectionable for some purposes. For example, in Patent 2,382,056, issued Aug. 14, 1945, to Harrison P. Hood, it is shown that glasses consisting of silica, boric oxide, alkali metal oxide and alumina, when made of commercial materials of high quality, have a substantial transmission in 1 mm. thickness for wave length 185 m$\mu$. These glasses are particularly suitable for envelopes and enclosures for mercury vapor arcs. It has been observed that such glasses containing 15% to 40% of boric oxide often times develop areas of internal discoloration and blackening, when so employed, whereby the life and efficiency of the lamp is decreased. This objectionable discoloration of the lamp is due chiefly to a peculiar instability of the glass resulting from its high boric oxide content, the glass being susceptible to a weathering action by water vapor. Such weathering action in extreme cases manifests itself as a growth of small discrete crystals on the interior surfaces of hollow articles such as tubes composed of the glass. Analysis shows that these crystals are boric acid, presumably formed by the combination of the moisture in the atmosphere with the boric oxide of the glass, and that no appreciable alkali is liberated from the glass.

A similar weathering action also occurs with borosilicate glasses which contain about 15% to 55% $B_2O_3$ and which are free from alkali metal oxides. Such borosilicate glasses have properties making them particularly desirable for sealing with certain metals, but their instability toward weathering seriously hinders their use for this purpose.

The primary object of this invention is to prevent the surfaces of borosilicate glass articles from weathering and to provide a method for this purpose.

Another object is to produce tubes, bulbs and the like of borosilicate glass which are suitable for mercury arc enclosures.

Another object is to prevent the exudation or liberation of boric acid or boric oxide from the surfaces of borosilicate glass articles when exposed to atmosphere containing water vapor.

Another object is to prevent internal blackening of mercury arc enclosures composed of borosilicate glass.

Another object is to increase the transmission for wave length 185 m$\mu$ of borosilicate glasses.

In my co-pending application, Serial Number 412,888 above referred to, it is shown that alkali alumina borosilicate glasses containing between 15% and 40% boric oxide can be stabilized against weathering and blackening. Since the filing of that application I have discovered that the method of stabilization therein described is equally applicable to borosilicate glasses containing between 15% and 55% boric oxide and being free of alkali metal oxides. Accordingly my new invention now comprises treating any borosilicate glass containing between 15% and 55% boric oxide for at least one hour with water in the fluid state at a temperature not exceeding about 100° F. and thereafter heating the glass near its annealing temperature for at least the time required to anneal it. This heating time, in general, is from one to three hours, except for extremely thin articles where the time would obviously be shorter. Water in the fluid state includes only gaseous and liquid water, since solid water, or ice, is ineffective for my purpose. The definition and determination of annealing temperature have been described by Howard R. Lillie in an article entitled "Viscosity of glass between the strain point and melting temperature," Jour. Am. Cer. Soc., vol. 14, page 502 (1931).

Of the two, a treatment with gaseous water is to be preferred and is best accomplished by exposing the glass to a warm humid atmosphere having a temperature in the neighborhood of 100° F. and a relative humidity of at least 50%. For this purpose the glass articles may be supported within a box-like enclosure provided with suitable means for furnishing water vapor to its interior, such as a pan of water containing wicks which are exposed to the air. The enclosure and its contents may be heated by electricity or other suitable means, but an inexpensive method is to locate it in close proximity to a lehr or other heating kiln. With very high relative humidities and temperatures near 100° F., a minimum time of one hour may be sufficient for an effective treatment. The time required for treatment increases greatly with lower humidities and temperatures and, for a relative humidity as low as 50% and temperatures below 100° F., the time required for effective treatment may amount to several days or a month or more, depending upon the composition of the glass. For example, tubing made of glass containing alkali metal oxide and about 25% $B_2O_3$ may be effectively treated or weathered by merely storing it in an exposed manner during the hot humid summer months.

As an alternative, the weathering step may be accomplished with equal effectiveness by treating the glass with liquid water by soaking it therein for an hour or more. This method is advantageous for some purposes, such as providing an accelerated weathering for the comparison of various glasses.

Following the weathering step, the glass articles are heated near the annealing temperature of the glass for a time sufficient to consolidate and stabilize the treated surface, which is at least that required to anneal the glass, and are then slowly cooled in the usual manner. For some glasses, a few minutes heating is sufficient. Other glasses, such as borosilicates containing alkali metal oxides, may require from one to three hours at a temperature from about 400° C. to about 450° C. As a result of the heat treatment, any crystalline growth on the surface of the glass caused by the humid air treatment disappears and tests have shown that it is vaporized and eliminated from the glass.

The weathering step may be carried to such an extreme that crazing of the glass surface will occur on subsequent heating and this should be avoided. Such crazing is a result of too long or too vigorous an exposure to the action of water and is more likely to be encountered when the weathering step is accomplished by soaking the glass in water. The use of steam under pressure also causes subsequent crazing of the glass. The proper length of time for best results with any particular weathering conditions may be readily determined by trial. As pointed out above, the use of a humid atmosphere under controlled conditions of time, temperature and humidity is preferable.

Borosilicate glasses which have been treated by the above described process show a decided improvement in chemical stability and resistance to blackening by contact with mercury vapor, but these results depend entirely upon the combination of the steps of the process. The weathering step alone does not substantially increase the stability nor prevent subsequent blackening by mercury vapor and the heat treatment of glass which has not previously been subjected to the weathering step is likewise substantially ineffective. The alkali borosilicate glasses herein considered are for the most part fabricated into tubing which is used extensively in the manufacture of mercury arc lamps. During manufacture of the lamp, electrodes and other parts are sealed into the ends of the tube and the moisture and products of combustion from the flames employed are trapped within the tube. To expedite their removal during evacuation of the lamp, it is customary to bake or heat the tube. Such heating is not equivalent to the heat treatment step of my process because the elimination of the moisture is relatively slow from the obstructed ends of the tube and, if the tube has not previously been treated by my process, the final "bake out" causes an increased attack of the glass surface in localized areas which thereafter blacken intensively during operation of the lamp. Tubes which have been treated by both steps of my process in its entirety are not objectionably affected during the manufacture and subsequent operation of a mercury arc lamp.

The effect of the weathering and heating steps of the above method is a surface effect and does not extend substantially within the body of the glass. If the treated surface be removed by treatment with hydrofluoric acid or by grinding, the improvement in stability and blackening resistance are lost and cannot be regained except by again weathering and heat treating the glass as described above.

Inasmuch as the glass, after being subjected to a humid atmosphere for the proper length of time in the weathering step of my process as described above, does not always show a growth of crystals on its surface or other visible effect, a convenient measure of the effectiveness of my process is the chemical stability of the glass before and after treatment. The determination of the chemical stability comprises determining the loss in weight of a sample of the glass by weighing it before and after it has been boiled ten minutes in a 2% aqueous solution of hydrochloric acid and subsequently dried for one hour at about 110° C. Borosilicate glasses which have been treated by my process show an average tenfold improvement in stability, that is, the loss in weight per unit area of the treated glass is on an average about one-tenth as great as that of the untreated glass. On particular samples this increase in stability may range from five times to twenty times that of the untreated glass.

A further important advantage resulting from the practice of my invention resides in the increase in transmission of the glass which is caused thereby. For reasons unknown the transmission of the glass for wave length 185 m$\mu$ is increased by an average of about 20% by my process, but the transmission for wave length 254 m$\mu$ is substantially unaffected.

By the expression "water in the fluid state," as used in the following claims, is meant water in a state other than the frozen state, that is, either liquid or gaseous water.

I claim:

1. The method of improving the stability of borosilicate glasses containing 15% to 55% $B_2O_3$, which comprises treating the glass for at least one hour with water in the fluid state at a temperature not exceeding about 100° F., and thereafter heating the glass near its annealing temperature for at least the time required to anneal said glass.

2. The method of improving the stability of borosilicate glasses containing 15% to 55% $B_2O_3$, which comprises treating the glass for at least one hour with water vapor at a temperature not exceeding about 100° F., and thereafter heating the glass near its annealing temperature for at least the time required to anneal said glass.

3. The method of improving the stability of borosilicate glasses containing 15% to 55% $B_2O_3$, which comprises confining the glass for at least one hour in a warm humid atmosphere having a temperature of about 100° F., and a relative humidity of at least 50%, and thereafter heating the glass near its annealing temperature for at least the time required to anneal said glass.

4. The method of improving the stability of borosilicate glasses containing 15% to 55% $B_2O_3$, which comprises contacting the glass for at least one hour with liquid water at a temperature not exceeding about 100° F., and thereafter heating the glass near its annealing temperature for at least the time required to anneal said glass.

5. The method of improving the stability and ultraviolet transmission of alkali-alumina-borosilicate glasses containing from 15% to 40% $B_2O_3$, which comprises treating the glass for at least one hour with water in the fluid state at a temperature not exceeding about 100° F., and thereafter heating the glass for one to three hours near its annealing temperature.

6. The method of improving the stability and ultraviolet transmission of alkali-alumina-borosilicate glasses containing from 15% to 40% $B_2O_3$, which comprises treating the glass for at least one hour with water vapor at a temperature not exceeding about 100° F., and thereafter heating the glass for one to three hours near its annealing temperature.

7. The method of improving the stability and ultraviolet transmission of alkali-alumina-borosilicate glasses containing from 15% to 40% $B_2O_3$, which comprises confining the glass for at least one hour in a warm humid atmosphere having a temperature of about 100° F., and a relative humidity of at least 50%, and thereafter heating the glass for one to three hours near its annealing temperature.

8. The method of improving the stability and ultraviolet transmission of alkali-alumina-borosilicate glasses containing from 15% to 40% $B_2O_3$, which comprises contacting the glass for at least one hour with liquid water at a temperature not exceeding about 100° F., and thereafter heating the glass for one to three hours near its annealing temperature.

9. An article composed of a borosilicate glass which contains 15% to 55% $B_2O_3$ and which has been treated for at least one hour with fluid water at a temperature not exceeding about 100° F., and thereafter heated near its annealing temperature for at least the time required to anneal said glass, the glass having a transmission for wave length 185 m$\mu$, which is higher than the transmission of the initial glass by an average of about 20%.

10. An article composed of an alkali-alumina-borosilicate glass which contains from 15% to 40% $B_2O_3$ and which has been treated for at least one hour with fluid water at a temperature not exceeding about 100° F., and thereafter heated for one to three hours near its annealing temperature, the glass having a transmission for wave length 185 m$\mu$, which is higher than the transmission of the initial glass by an average of about 20%.

JOHN L. SHELDON.